April 28, 1953 — A. C. SMITH, JR — 2,636,512
FLOW DIRECTING BAFFLE FOR REDUCING THE TURBULENCE
OF FLOW OF FLUID ENTERING A SPACE FROM A CIRCUIT
Filed Aug. 14, 1950
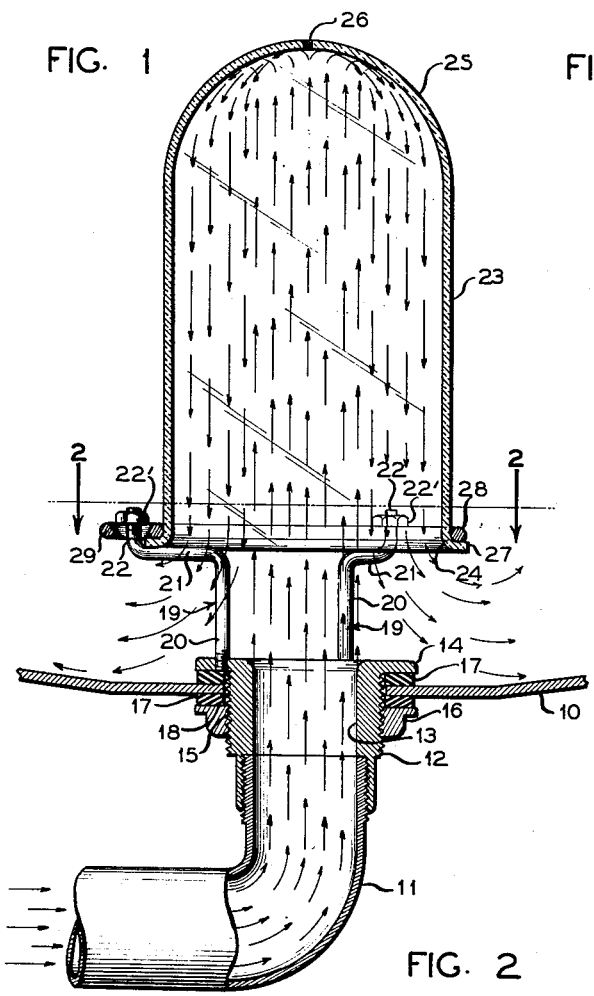
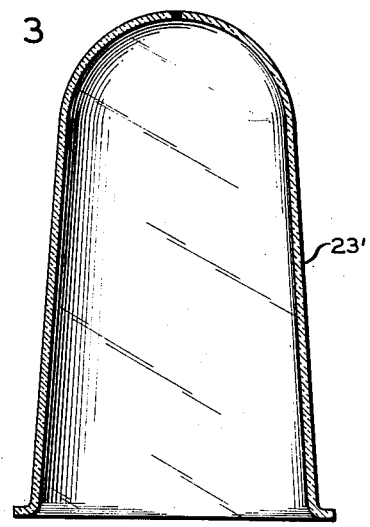
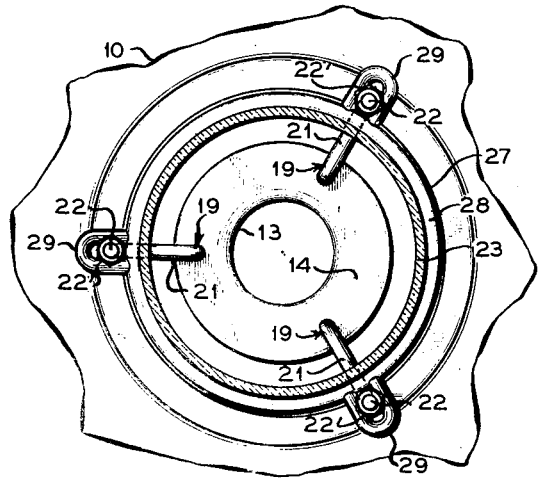
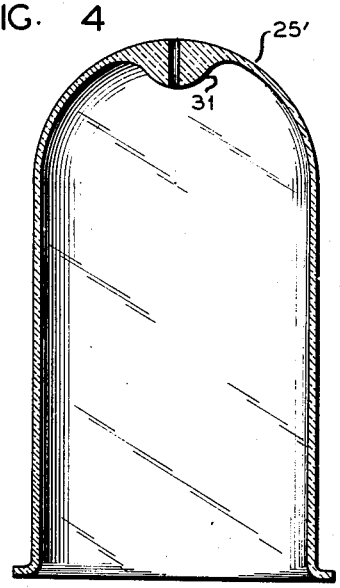
INVENTOR.
A. C. SMITH, JR.
BY
A. Yates Dowell
ATTORNEY Patented Apr. 28, 1953

2,636,512

UNITED STATES PATENT OFFICE 2,636,512

FLOW DIRECTING BAFFLE FOR REDUCING THE TURBULENCE OF FLOW OF FLUID ENTERING A SPACE FROM A CIRCUIT

Albert C. Smith, Jr., Wilkes-Barre, Pa., assignor, by mesne assignments, to A. Gusmer Inc., Hoboken, N. J., a corporation of New Jersey Application August 14, 1950, Serial No. 179,165

7 Claims. (Cl. 137—590)

This invention relates to the transfer of fluids and more particularly to the action of the fluid during such transfer and provides for dissipation of the kinetic energy or energy of flow such that turbulence is substantially eliminated. The invention has particular application in the brewing industry, although it is obvious that it is not so limited in use.

In the processing of fermented malt beverages such as beer, ale and the like, the liquid must be transferred from one tank to another frequently. Included in the steps which take place after fermentation are those of aging, carbonating and filtering. After fermentation of a malt beverage, it is highly desirable to prevent it from absorbing any air, as air is detrimental to the stability of the complex protein constituents which give beer its clear, pleasant tasting quality. However, in transferring beer after fermentation into a tank, usually a substantial amount of turbulence takes place as the beer enters the tank and under ordinary circumstances a substantial amount of air would be absorbed by the beer.

In the brewing industry vats or tanks of great size are used and these are usually filled and emptied through an opening at the bottom. During the first approximate 25% of the filling of such a tank, the beer entering at the bottom under pressure shoots upwardly into the tank and is, therefore, quite turbulent. Furthermore, the fact that beer is a fermented beverage from which most air has been expelled by fermentation, increases its susceptibility of contact with the atmosphere in which the beer is placed. In entering the tank, the breaking up of the beer into fine spray particles increases tremendously the surface of the beer in contact with the atmosphere and as a result increases the absorption of the atmosphere with which the beer is in contact.

In practice, the brewing industry frequently employs an atmosphere of carbon dioxide in the tanks which are to be filled in order that the incoming beer contact carbon dioxide instead of air. This carbon dioxide is usually a by-product of the fermentation process in the brewery. However, the transfer to the tank of the carbon dioxide and the transfer from the tank after its use is a complex and expensive process requiring a great quantity of carbon dioxide and equipment.

Accordingly, it is an object of the present invention to provide a fluid flow regulator and baffle for controlling the flow characteristics of the fluid, and particularly beer, into a relatively large space such that the fluid under pressure is received in the space or tank with substantially no turbulence in order that the area of contact between the beer and the surrounding atmosphere is held to a minimum.

A further object of the invention is the provision of a baffle which is easily and simply constructed, sturdy, capable of easy installation and removal and which provides for the smooth flow of fluid from a conduit into a larger space.

These and other objects of the invention will become apparent from the following description taken in conjunction with the accompanying drawing, in which:

Fig. 1 is a vertical section through a fluid flow regulator constructed in accordance with the present invention and illustrating the flow of fluid thereinto from a conduit, and from the regulator into a tank;

Fig. 2, a section on the line 2—2 of Fig. 1;

Fig. 3, a section of a modified baffle element; and

Fig. 4, a section through a further modified baffle element.

Referring to the drawings, a section through a portion of the bottom of a tank 10 in which beer or other fluid is to be received has a conduit 11 of conventional construction to convey the incoming fluid to the tank. Connected to the conduit 11 is a tank fitting 12 having a bore 13 in communication with the bore of the conduit 11 and a flange 14 at its other end. The neck 15 of the fitting is threaded to receive a fastener 16 and gaskets 17 are provided in the form of collars about the neck of the fitting between which the edges defining the aperture 18 in the tank bottom are received and held by the nut 16. Connected to the fitting are upstanding support members 19 which are preferably received in threaded openings in the flange 14. These support members each consist of a relatively long straight portion 20 which, when positioned by connection to the flange, extend substantially parallel to the axis of the fitting. Disposed at substantially right angles to the main portion 20 is a relatively short leg 21 and disposed at substantially right angles to it is a shorter leg 22 which is threaded to receive a fastener 22'. In other words, the support 19 consists essentially of a Z-shaped member having a relatively long leg 20 and a much shorter leg 22, the extreme ends of the member being threaded to receive suitable fasteners.

Supported above and in substantial axial alignment with the fitting is a cylinder 23 which has an open end 24, whose diameter is approximately twice that of the bore 13 of the fitting although this is not a critical relationship. The cylinder is preferably of glass though other materials may be used. The other end of the cylinder is closed by a preferably dome-shaped portion 25 and has a relatively small aperture 26 therein to permit the escape of trapped air or other gas. At the other end, the cylinder is provided with a lip 27 to aid in its support. Positioned around the cylinder and closely adjacent to the lip is a supporting member 28 of substantially circular configuration and having projecting ears 29 of U-shaped configuration for the reception of the short leg members 22 of the supports 19. In use the lip 27 is drawn firmly against a leg 21 of the support and is rigidly and securely held by the fastener 22' between leg 21 and the ear and circular portion of the ring member 27.

In operation the cylinder 23 receives the flow of fluid from the conduit and fitting, which is axially aligned with the cylinder, and the initial turbulence and spray is confined within the walls and dome of the cylinder. As the flow continues, air is permitted to escape through the aperture 26 at the top of the dome and after a few moments the entire cylinder becomes filled with a body of smoothly flowing liquid which escapes between the open end of the cylinder and the spaced fitting. Thus, at the very beginning of the flow the initial turbulence takes place within the cylinder where contact with the atmosphere is restricted, and within a brief time the flow becomes substantially smooth, along the lines indicated in Fig. 1 of the drawing.

Not only is the direction of flow changed from upwardly from the center of the bottom portion of the tank to substantially radially of the tank but in being changed the energy of flow of the fluid is substantially dissipated such that the velocity of the liquid stream is reduced to about 20% of that of the incoming fluid within the conduit. The reasons for the reduction in the flow energy are apparent from a consideration of what takes place as the fluid enters the tank. The pressure under which the fluid flows causes it to rise to a height which would be substantially as high or higher than the top of the dome portion of the cylinder. However, when the fluid reaches the dome, its direction is changed by its being brought into contact with the dome and from the top of the dome the flow is down and counter to the center core of incoming fluid. Contact between the center core and the outward downwardly flowing portion of the fluid causes energy to be dissipated, as well as the working of the incoming fluid against the weight of the column of the fluid contained within the cylinder, the column being confined. The further direction change as the fluid is discharged against fluid already in the tank dissipates further energy.

It is apparent that the fluid flow regulator may be used in other positions than the vertical although this is the preferred position.

The modification of the invention shown in Fig. 3 is similar to the form shown in Fig. 1 except that the walls 23' of the member are substantially frusto-conical in configuration in order to provide for an increase in conduit area as the fluid flows from the top of the dome-shaped portion downwardly.

In the still further modification of Fig. 4 the dome-shaped portion 25' is provided with a flow directing portion 31 which directs the flow of the incoming stream evenly on all sides of the central portion or axis of the cylinder.

Thus, the invention includes a baffle comprising a cylindrical member having a substantially dome-shaped end which is supported and spaced from the intake fitting of a conduit through which fluid is received into a relatively large receptacle in order to reduce the turbulence of the incoming fluid and its contact with the surrounding atmosphere.

It is apparent that the embodiment of the invention shown is merely one illustration of the invention and that the invention is not restricted to the details of the construction shown, but contemplates reasonable variations therefrom.

It will be obvious to those skilled in the art that various changes may be made in the invention without departing from the spirit and scope thereof and therefore the invention is not limited by that which is shown in the drawings and described in the specification, but only as indicated in the appended claims.

What is claimed is:

1. A flow directing baffle for reducing the turbulence of flow of fluid entering a space from a conduit, comprising a substantially cylindrical member having one end open and the other closed by substantially dome-like structure having a bleeder opening, an inlet fitting, the member having a flange near the open end, a collar encircling the body adjacent the flange and having engaging means, inwardly offset leg members engaged at one end with said engaging means and having their central portions engaged with the member, the other end of said leg members being connected to said inlet fitting holding it in spaced relation from the open end of the member and substantially in axial alignment therewith.

2. In a flow directing baffle reducing the turbulence of the flow of fluid entering a space from a conduit, the combination of an elongated tubular member having one end open and its other end closed by a substantially dome-like structure provided with means for bleeding its upper portion, an inlet conduit, means for supporting said flow directing baffle from said inlet conduit including spaced leg members having adjacent one end thereof offset portions, engaged with the open end portion of said baffle and means for retaining said baffle in contact with said offset portions, the other ends of said leg members constructed for connection to said inlet conduit for holding it in spaced relation from the open end of said tubular member and substantially in axial alignment therewith.

3. The structure of claim 2, the elongated tubular member being frusto-conical and having its axis substantially coincident with the body opening.

4. The structure of claim 2, the elongated tubular member having internal flow directing means for reversing flow therewithin.

5. The structure of claim 2, the elongated tubular member being substantially cylindrical and having its axis substantially coincident with the body opening.

6. The structure of claim 2, the open end of said tubular member having a diameter longer than the diameter of the adjacent open end of said inlet conduit.

7. In a flow directing baffle for reducing the turbulence of the flow of fluid entering a space from a conduit, the combination of a substantially cylindrical member having one end open and the other closed by substantially dome-like structure having a bleeder opening, the member having an outwardly extending flange at the open end, a collar encircling the body adjacent the flange and having engaging means, an inlet conduit, and inwardly offset leg members engaged at one end with said engaging means on said member, the other end of said leg members being connected to said inlet conduit holding it in spaced relation from the open end of the member and substantially in axial alignment therewith.

ALBERT C. SMITH, JR.

References Cited in the file of this patent

UNITED STATES PATENTS

| Number | Name | Date |
| --- | --- | --- |
| 895,229 | Beddoes | Aug. 4, 1908 |
| 1,087,242 | Kelly | Feb. 17, 1914 |
| 1,251,295 | Sherwin | Dec. 25, 1917 |
| 1,400,511 | Baker | Dec. 20, 1921 |
| 2,123,809 | Seitz | July 12, 1938 |
| 2,207,057 | Gulick | July 9, 1940 |